Patented Mar. 15, 1938

2,111,342

UNITED STATES PATENT OFFICE 2,111,342

CAUSTIC RESISTANT MATERIAL

William F. Waldeck, Wadsworth, Ohio, assignor to Pittsburgh Plate Glass Company, a corporation of Pennsylvania No Drawing. Application October 2, 1936, Serial No. 103,784

5 Claims. (Cl. 23—240)

The present invention relates to the provision of a material suitable for the coating of, or for the manufacture of, containers and other apparatus employed in the manufacture, storage, shipment, and use of chemical materials, and it has particular relation to compositions for coating containers and other apparatus employed in connection with the manufacture, storage, shipment, or use of concentrated solutions of the hydroxides of the alkali metals.

One object of the invention is to provide a coating material which readily adheres to the surfaces of metals and other materials used in the manufacture of apparatus for storing or otherwise treating concentrated caustic solutions to form films which are highly resistant to the caustic even for relatively long periods of time.

A second object of the invention is to provide a coating material of the above described characteristics, which is composed of inexpensive ingredients and which may be applied to, or formed into, various embodiments of apparatus adapted for contact with caustic solutions, by the simple and inexpensive methods employed in connection with paints, lacquers and various resinous materials.

These and other objects will be apparent from consideration of the following specifications and the appended claims.

The hydroxides of the alkali metals, notably sodium hydroxide, are usually obtained by electrolysis of a salt, such as sodium chloride, or by causticization of a carbonate, such as sodium carbonate, by contact with an aqueous solution or suspension of lime. Such solutions of hydroxides are normally of a concentration of about 8 to 12 per cent, which for most industrial applications is so dilute as to necessitate further concentration. Further concentration is also necessary because the large percentage of water present in the dilute solutions would render shipping costs exorbitant. Accordingly, it is customary to evaporate as much water as is practicable from the solution. By ordinary methods of evaporation, solutions of 50 to 70 per cent concentration may be obtained with comparative ease. However, as the concentration further increases, the vapor pressure is rapidly reduced and the heat requirements for the evaporation of water from the solution becomes excessive. Furthermore, the concentrated solutions of caustic become extremely corrosive and no apparatus now available will satisfactorily withstand the action of the caustic during the later stages of dehydration.

For many purposes, caustic of 50 to 70 per cent concentration is quite satisfactory and for that reason, in many instances, the concentration of the caustic is stopped within that range. The concentrated material is then charged into tank cars or other containers for shipment.

In the manufacture of many products, such as soap and rayon, caustic of high purity and low color is desirable or absolutely necessary. For this reason, most of the hydrated caustic is subjected to careful purification prior to shipment in order to eliminate such impurities as iron compounds, manganese compounds, and the like. However, it is found that the caustic even of 50 to 75 per cent concentration under the conditions of storage or shipment tends to absorb objectionable amounts of iron and manganese from the containers.

Heretofore no entirely satisfactory method of eliminating this objectionable attack upon the iron of the containers has been available. The application of highly resistant coatings, of course, suggests itself, but most materials suitable for coating purposes are inapplicable. Nickel linings have been tried and are found successfully to withstand corrosion. However, the cost of nickel coating a single tank car amounts to several thousand dollars and for that reason is prohibitive. Ordinary coating materials, such as natural and artificial resins, rubber, and the like, are of little or no value because they do not withstand the attack of caustic for any substantial period of time. In many instances, they are within themselves objectionable because they tend further to contaminate the product.

The present invention involves the discovery that certain cellulose ethers, notably ethyl cellulose, when applied as a coating material to containers used to store or ship caustic, or when otherwise employed to form the surface of apparatus, exhibits a remarkable degree of resistance to the action even of highly concentrated solutions of caustic soda. In fact, in some instances, it is observed that the higher concentration of the caustic solution, the more resistant is the cellulose ether in contact therewith.

The cellulose ethers are, within themselves, of conventional character and the methods of manufacturing and treating such materials are well understood by those skilled in the art and do not require discussion.

Cellulose ethers, such as ethyl cellulose, may be employed without modification in the coating or formation of caustic resistant containers and apparatus, but if desired, it may be modified by the addition of suitable plasticizers and pigments and the like. Care must be exercised in the selection of the modifiers because most of the modifying agents conventionally employed in ordinary lacquer forming resins are, within themselves, susceptible to solution in, or decomposition by, concentrated caustic solutions.

Practically any volatile solvent for ethyl cellulose or the other cellulose ethers which may be employed is applicable in the preparation of solutions suitable for most coating operations. The following constitutes a specific example of one such solvent composition.

| | Parts |
|---|---|
| Alcohol | 21.5 |
| Xylene | 46.2 |
| Acetate of monomethyl ether of ethylene glycol | 6.5 |
| Toluene | 25.8 |

The ethyl cellulose is preferably dissolved in the solvent mixture to form a solution containing 6 to 15 per cent of ethyl cellulose. The proportions of the ethyl cellulose may be varied over a wide range, but in general, it is desirable to add as much as is conveniently practicable without the viscosity of the resultant solution becoming too high. The various components of the solvent may likewise be subjected to various modifications without departure from the scope of the present invention. It is, of course, apparent that the solvent does not constitute a permanent element in the caustic resistant films, but instead it is eliminated by evaporation so that there is practically no restriction placed upon the selection of a solvent. Accordingly, any material which is a volatile solvent for the cellulose ether is applicable.

The modes of application of the cellulose ethers are conventional and involve brushing, spraying, and dipping. In some instances, it may be desirable to pre-form suitable films of ethyl cellulose or the related cellulosic ethers and then to apply the films to the surfaces which are to be protected by application of heat and pressure, or by use of adhesives, or any other convenient method.

The films are highly inert even to caustic solutions of 70 per cent or higher concentration at temperatures up to or above 100 deg. C. As previously stated, films of very high resistance to attack even by the most concentrated solutions of caustic may be prepared without the use of any permanent modifier for the cellulose ethers. However, if desired, the plasticity and water resistance may be increased by incorporation of suitable inert plasticizers. One convenient and satisfactory plasticizer is obtained by the chlorination of diphenyl. Products suitable for the purpose are sold under the trade name of "Arochlor". These compounds are quite compatible with ethyl cellulose and also exhibit a high degree of resistance to the action of concentrated caustic. Practically any amount of chlorinated diphenyl up to 30 or 40 per cent based upon the content of ethyl cellulose may be employed. In some cases where maximum resistance to the action of caustic is not required, the films of cellulose ether may be modified by the addition of a suitable natural or artificial resin. Soluble phenol-formaldehyde resins, known as "Amberol" resins, may be added to the ethyl cellulose. The latter resin may be employed in amounts up to 20 or 30 per cent or even higher. These modifying resins within themselves do not increase caustic resistance of the films. However, they do enhance certain desirable properties of ethyl cellulose, notably adhesion and water resistance.

Pigments, if inert, may likewise be incorporated into the cellulose ether. Good results have been obtained by the inclusion of from 10 to 25 per cent of ground mica or asbestos or the like.

Ethyl cellulose is highly suitable for coating surfaces of iron or steel, such as those of tank cars, to prevent corrosion by caustic soda solutions. However, it can also be applied to any other common metal, such as copper, aluminum, zinc, etc., which may be exposed to the action of the solutions. Similarly, glass, porcelain, rubber, wood, and other materials may be coated to obtain a resistance to caustic. In some instances, it is desirable to give the metallic surfaces a preliminary treatment in order to improve adhesion between the cellulose ether and the metal. Processes involving the application of a phosphate of a metal, such as zinc, cadmium, or the like, are quite suitable. Numerous methods of applying such treatments are available and practically any of these which provide uniform phosphatic coatings may be employed. Excellent results are obtained by application of a zinc phosphate coating by means of an alternating electrical current. Details of this process may be obtained from British Patent No. 435,773.

Masses of ethyl cellulose, either alone or admixed with plasticizers or pigments, may be molded or otherwise shaped into apparatus for treatment of caustic.

The use of ethyl cellulose in the coating or formation of apparatus for handling caustic solutions has been specifically discussed, however, ethyl cellulose may be replaced by other cellulosic ethers, including methyl cellulose, butyl cellulose, benzyl cellulose, mixed cellulose ethers, such as ethyl-benzyl cellulose, and the like. Mixtures of any two or more of these latter ethers with each other and with ethyl cellulose may likewise be employed.

Coatings of cellulosic ethers will withstand the action of caustic soda solutions over a long period of time. Upon eventual failure of the coating material under the action of aqueous caustic, the residual films may be removed in any convenient manner, for example, by solution, scraping or by abrasion, and may then be replaced by new films.

Although only the preferred forms of the invention have been described, it will be apparent to those skilled in the art that these are merely exemplary and that numerous modifications may be made therein without departure from the spirit of the invention or scope of the appended claims.

What I claim is:

1. A method of preserving caustic soda of at least 50% concentration, in metallic containers, from contamination by the metallic surfaces, which comprises applying to the surfaces films of a cellulose ether.

2. A method as defined in claim 1, in which the cellulose ether is ethyl cellulose.

3. A process as defined in claim 1, in which the cellulose ether is admixed with an inert pigment.

4. A method as defined in claim 1, in which the cellulose ether is admixed with finely divided mica.

5. A process as defined in claim 1 in which the metallic containers are composed essentially of iron.

WILLIAM F. WALDECK.